US009674589B2

(12) United States Patent
Osterloh et al.

(10) Patent No.: US 9,674,589 B2
(45) Date of Patent: Jun. 6, 2017

(54) COORDINATED COLLECTION OF METERING DATA

(75) Inventors: Christopher Lloyd Osterloh, Waseca, MN (US); James Patrick Ogle, Spokane, WA (US); Bret Gregory Holmdahl, Greenacres, WA (US)

(73) Assignee: Itron, Inc., Liberty Lake, WA (US)

( * ) Notice: Subject to any disclaimer, the term of this patent is extended or adjusted under 35 U.S.C. 154(b) by 370 days.

(21) Appl. No.: 13/464,746

(22) Filed: May 4, 2012

(65) Prior Publication Data

US 2013/0297771 A1 Nov. 7, 2013

(51) Int. Cl.
*G06F 15/173* (2006.01)
*H04Q 9/00* (2006.01)

(52) U.S. Cl.
CPC ........... *H04Q 9/00* (2013.01); *H04Q 2209/10* (2013.01); *H04Q 2209/25* (2013.01); *H04Q 2209/60* (2013.01)

(58) Field of Classification Search
CPC . H04L 12/1403; H04L 67/12; H04L 12/2803; H04L 12/2628; H04L 12/2823; H04L 12/14; H04L 12/1482; H04L 47/822; H04L 29/08261
USPC .............................. 709/224; 710/18; 370/252
See application file for complete search history.

(56) References Cited

U.S. PATENT DOCUMENTS 6,856,257 B1 * 2/2005 Van Heteren ............. 340/870.02
7,089,089 B2 * 8/2006 Cumming et al. ............ 700/295
2002/0172191 A1 * 11/2002 Harrison ............. H04L 12/5692 370/352
2004/0006620 A1 * 1/2004 Howard et al. ................ 709/224
2005/0209927 A1 * 9/2005 Aaltonen ........... G06Q 30/0601 705/26.1
2006/0004679 A1 * 1/2006 Cahill-O'Brien et al. ... 705/412
2006/0038700 A1 * 2/2006 Cumeralto et al. ...... 340/870.02
(Continued)

FOREIGN PATENT DOCUMENTS

JP 2009032012 A 2/2009
WO WO2008033514 A2 3/2008

OTHER PUBLICATIONS

The PCT Search Report mailed Jul. 25, 2013 for PCT application No. PCT/US13/38285, 13 pages.
(Continued)

*Primary Examiner* — Mohamed Wasel
*Assistant Examiner* — Tsung Wu
(74) *Attorney, Agent, or Firm* — Lee & Hayes, PLLC

(57) ABSTRACT

Collection of resource consumption data may be coordinated by designating, for each endpoint in a utility communication network, a single data collector to be responsible for reporting resource consumption data of the respective endpoints to a head-end computing device. If the head-end computing device does not receive resource consumption data from one or more endpoints, the head-end computing device may request the missing resource consumption data from one or more secondary or tertiary data collectors that receive resource consumption data from the one or more endpoints. Additionally, if a data collector is missing resource consumption data from an endpoint during a reporting period, upon receiving resource consumption data from the endpoint during a subsequent reporting period, the data collector may request the missing resource consumption data.

15 Claims, 5 Drawing Sheets

(56) References Cited

U.S. PATENT DOCUMENTS

| | | | |
|---|---|---|---|
| 2007/0013547 A1* | 1/2007 | Boaz | 340/870.02 |
| 2007/0247331 A1* | 10/2007 | Angelis et al. | 340/870.02 |
| 2009/0135836 A1* | 5/2009 | Veillette | G01D 4/004 370/400 |
| 2010/0188259 A1 | 7/2010 | Johnson et al. | |
| 2010/0188263 A1 | 7/2010 | Cornwall et al. | |
| 2010/0287019 A1* | 11/2010 | Guo | G06F 11/3442 709/224 |
| 2011/0063126 A1* | 3/2011 | Kennedy | G01D 4/002 340/870.02 |
| 2011/0074598 A1 | 3/2011 | Cornwall et al. | |
| 2011/0122849 A1* | 5/2011 | Jain | H04W 74/0808 370/336 |
| 2011/0246816 A1* | 10/2011 | Hsieh | G06F 17/30563 714/4.12 |
| 2012/0201146 A1* | 8/2012 | Shuey et al. | 370/252 |
| 2014/0018971 A1* | 1/2014 | Ellis et al. | 700/297 |

OTHER PUBLICATIONS

The Extended European Search Report mailed Jul. 22, 2014 for European patent application No. 12169872.4, 10 pages.

\* cited by examiner

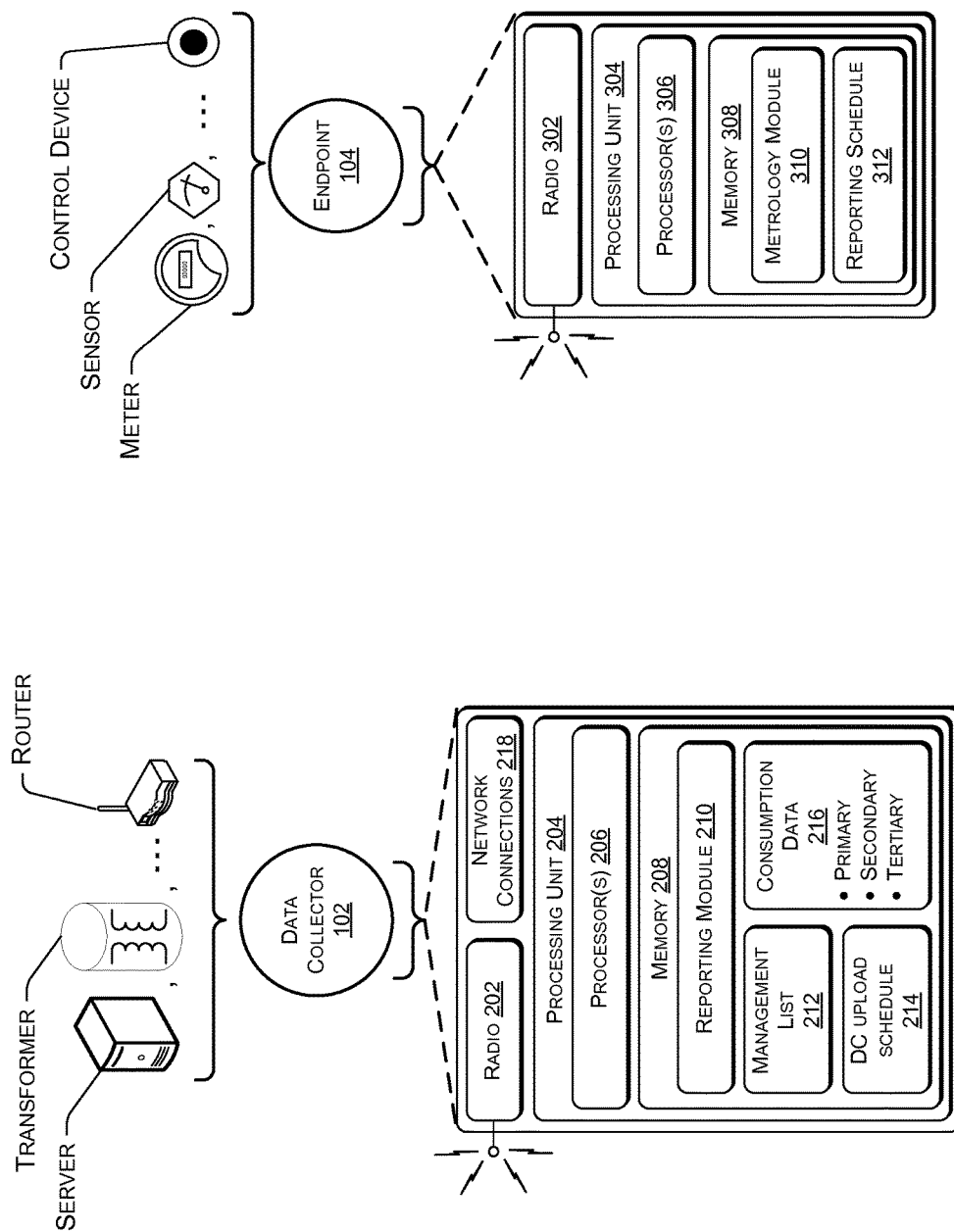

MANAGEMENT
LIST(S)
126

| Endpoint | Primary DC | Secondary DC | Tertiary DC | Primary DC Load | Secondary DC Load | Tertiary DC Load |
|---|---|---|---|---|---|---|
| 104-1 | 102-1 | Not shown | Not shown | 72% | Not shown | Not shown |
| 104-2 | 102-1 | Not shown | Not shown | 72% | Not shown | Not shown |
| 104-3 | 102-1 | Not shown | Not shown | 72% | Not shown | Not shown |
| 104-4 | 102-2 | 102-1 | 102-3 | 56% | 72% | 69% |
| 104-5 | 102-3 | Not shown | Not shown | 69% | Not shown | Not shown |
| 104-6 | 102-3 | Not shown | Not shown | 69% | Not shown | Not shown |
| 104-7 | 102-3 | Not shown | Not shown | 69% | Not shown | Not shown |

FIG. 4

CONSUMPTION
DATA
128

| | Period 1 | | Period 2 | | ... | Current Period | |
|---|---|---|---|---|---|---|---|
| Endpoint | Units Consumed | Received From | Units Consumed | Received From | | Units Consumed | Received From |
| 104-1 | 2 | Primary | 2 | Primary | ... | 3 | Primary |
| 104-2 | 3 | Primary | 2 | Primary | ... | 3 | Primary |
| 104-3 | 7 | Primary | 7 | Primary | ... | 6 | Primary |
| 104-4 | 6 | Primary | 5 | Secondary | ... | | |
| 104-5 | 12 | Primary | 9 | Primary | ... | 11 | Primary |
| 104-6 | 6 | Primary | 5 | Primary | ... | | |
| 104-7 | 8 | Primary | 9 | Primary | ... | | |

FIG. 5

COORDINATED COLLECTION OF METERING DATA

BACKGROUND

An electric, water or natural gas utility company may manage hundreds of thousands or millions of metering devices located at customer sites. Such meters measure utility consumption and may be considered endpoints in a network, which may be configured as an advanced metering infrastructure (AMI) for automated meter reading (AMR). These numerous endpoints generate large amounts of resource consumption data. These large amounts of resource consumption data are generally disorganized and are not received in any particular order. Furthermore, the generation of resource consumption data and, hence network traffic, is often cyclical and peaks at a certain time, such as the start of a new business day or other reporting period. To handle these peak loads, utility companies either must either scale up their central office computing systems or be willing to tolerate greater latency in processing incoming resource consumption data.

Additionally, as the load on the network increases, such as during peak times, so does the incidence of collisions of communications, thereby degrading the efficiency of the network. These inefficiencies result in increased cost and network overhead for the utility company.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 is a schematic diagram showing additional details of an example data collector of the architecture of FIG. 1.

FIG. 3 is a schematic diagram showing additional details of an example endpoint of the architecture of FIG. 1.

FIG. 4 is a table illustrating an example management list of endpoints, designating a primary data collector responsible for reporting resource consumption for each endpoint, and designating secondary and tertiary data collectors from which resource consumption of each endpoint can be obtained if it is not received from the primary data collector.

FIG. 5 is a table illustrating example resource consumption data received at the central office from one or more data collectors.

DETAILED DESCRIPTION

Overview

Figure 1:
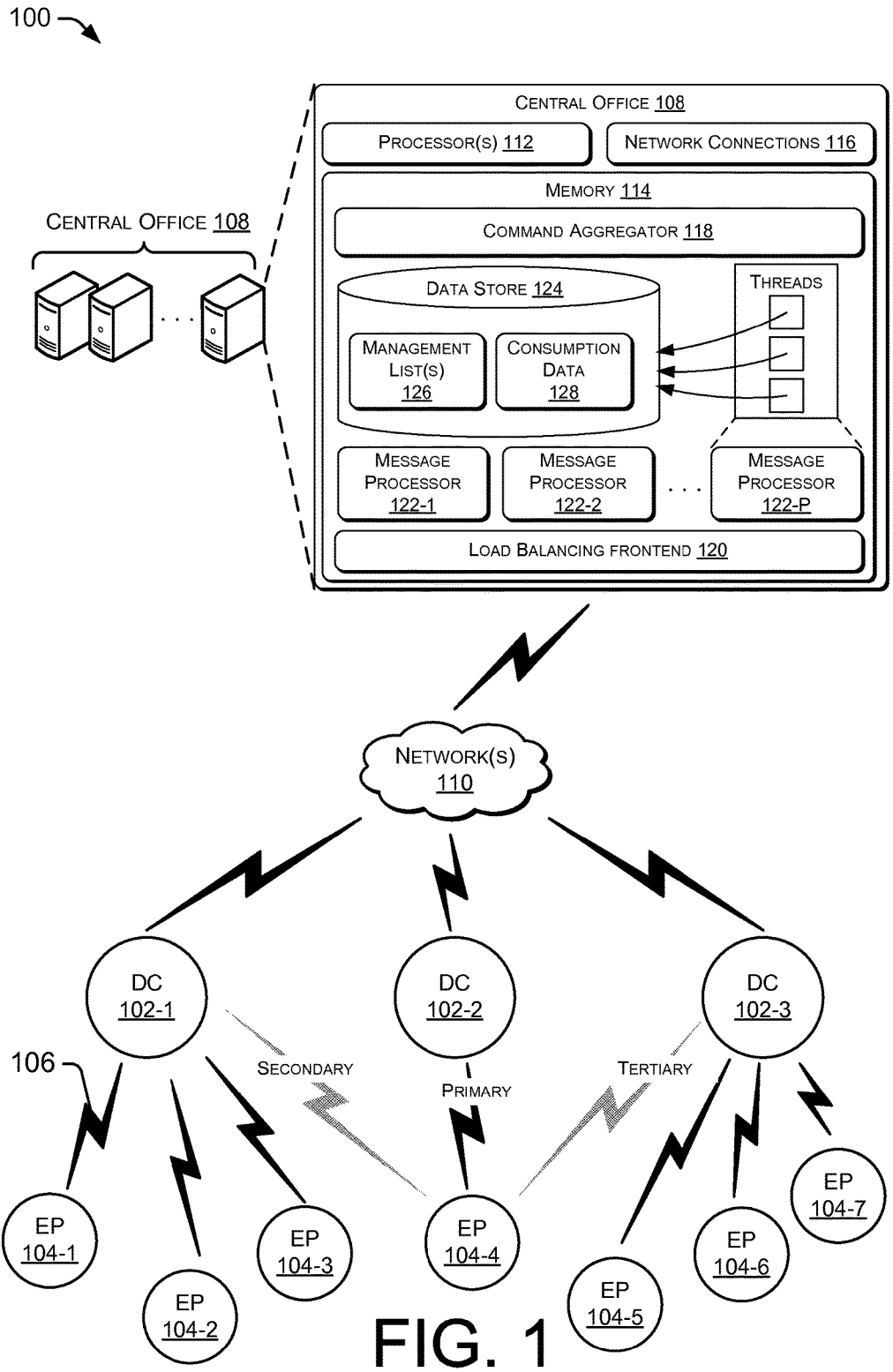
FIG. 1 is a schematic diagram of an example architecture of a wireless network in which collection of resource consumption data is coordinated amongst multiple data collectors, such that a single, priority data collector is responsible for reporting resource consumption data for each endpoint.

As discussed above, utility companies often administer hundreds of thousands or millions of metering devices located at customer sites. Such meters measure utility consumption and may be integral or associated with endpoints in a utility communication network, which may be configured as an advanced metering infrastructure (AMI) for automated meter reading (AMR).

The numerous endpoints in the AMI generate large amounts of resource consumption data, which up to this point has been received in a generally disorganized or uncoordinated manner. Consequently, during periods of peak loading, the utility companies' central office computing systems have been tasked with organizing the incoming resource consumption data before it can be processed. Additionally, the uncoordinated way in which resource consumption data has been reported has resulted in communication collisions, which further impeded the collection of the resource consumption data and degraded the efficiency of the network. These inefficiencies have resulted in increased cost and network overhead for the utility company.

This application describes techniques for coordinating when and how resource consumption data is collected from endpoints, and subsequently uploaded to the central office. For instance, in one implementation, collection of resource consumption data may be coordinated by designating, for each endpoint in a utility communication network, a single data collector to be responsible for reporting resource consumption data of the respective endpoints to a central office. If the central office does not receive resource consumption data from one or more endpoints during a reporting period, the central office may request the missing resource consumption data from one or more secondary or tertiary data collectors that also receive (but are not responsible for reporting) resource consumption data from the one or more endpoints. Additionally, in some instances, if a data collector is missing resource consumption data from an endpoint during a reporting period, upon receiving resource consumption data from the endpoint during a subsequent reporting period, the data collector may request the missing resource consumption data.

In this way, collection of resource consumption data from numerous endpoints or nodes, and upload of the resource consumption data from multiple data collectors to a central office can be coordinated and streamlined. As used herein, the term "node" refers to any device on the network which is capable of communicating with other devices of the network, including without limitation, endpoints, data collectors, servers, routers, sensors, control points, relays, etc.

By coordinating collection of resource consumption data as described herein, a utility company is able to reduce duplicative reporting of resource consumption data by multiple data collectors, thereby reducing overall network loading and incidences of communication collisions. Furthermore, by scheduling collection of resource consumption data more evenly over a reporting period, the utility company is able to smooth out peaks in resource consumption data collection and thereby minimize the need for additional computing hardware and infrastructure at the central office.

While the examples given herein are described primarily in the context of a network in which endpoints are arranged in direct communication with one or more data collectors, in other examples, aspects of the techniques described herein may also apply to networks in which communications are transmitted through one or more other intermediary nodes or endpoints before being transmitted to a central office. For example, the techniques described herein may apply to endpoints arranged in a wireless, utility mesh network, in which communications are passed or relayed from a child node upstream through one or more intermediary nodes on their way to a root node of the network for routing to the central office.

Example Architecture

FIG. 1 is a diagram illustrating an example networked environment or system 100 of a utility communication network configured for automated meter reading (AMR). The system 100 may include a plurality of data collectors (DCs) 102-1, 102-2, and 102-3 (collectively referred to as data collectors 102) and a plurality of endpoints (EPs) 104-1 through 104-7 (collectively referred to as endpoints 104). While three data collectors 102 and seven endpoints 104 are shown in this example for ease of illustration, in practice systems according to this disclosure may include as many nodes (endpoints, data collectors, and potentially other devices) as may be present in a utility company's AMI or network(s).

The nodes of the network (e.g., data collectors 102 and endpoints 104) may communicate with each other over a common communication channel 106. The common communication channel 106 may utilize a radio frequency (RF) or a wired medium. A wired medium may include dedicated wiring, or may include power line communication (PLC), i.e., a data signal superimposed over an alternating current (AC) power distribution line. The data collector 102 may also communicate with a central office 108 via a wired or wireless network 110, such as the Internet, a cellular network, or the like. The network 110 may itself be made up of one or more other wired and/or wireless networks.

Each of the endpoints 104 is assigned a primary data collector 102, which is responsible for reporting resource consumption data for the respective endpoint to the central office 108. Multiple data collectors 102 may receive or overhear data broadcast by a given endpoint, but the data collectors 102 are configured to automatically report or push resource consumption data only for the endpoints for which they are the primary data collector. In this way, duplicate information is not transmitted to the central office, thereby reducing the amount of network traffic. Additionally, in some instances, some or all of the endpoints 104 may be assigned secondary and potentially tertiary data collectors. The secondary and tertiary data collectors for a respective endpoint are data collectors that are within broadcast range of the respective endpoint and that receive resource consumption data from the respective endpoint. Secondary and tertiary data collectors store the received resource consumption data, but do not push the resource consumption data to the central office 108. However, in the event that the central office 108 does not receive resource consumption data from a particular endpoint during a reporting period, the central office may request this missing data from the secondary and/or tertiary data collectors.

In the example of FIG. 1, data collectors 102-1, 102-2, and 102-3 are all within broadcast range of endpoint 104-4, and all receive resource consumption data from endpoint 104-4. However, data collector 102-2 is the primary data collector for endpoint 104-4 and is, therefore, the only data collector in this example that automatically reports or pushes resource consumption data for endpoint 104-4 to the central office 108. Data collector 102-1 is designated as the secondary data collector for endpoint 104-4, and data collector 102-3 is designated as the tertiary data collector for endpoint 104-4. As such, if data collector 102-2 fails to report resource consumption data for endpoint 104-4 during a certain reporting period (e.g., due to interference, communication collisions, the data collector 102-2 being busy when the endpoint transmitted the resource consumption data, etc.), the central office 108 may request the missing data from the secondary data collector (102-1 in this example) and/or the tertiary data collector (102-3 in this example).

The central office 108 may include one or more servers or other computing devices (sometimes referred to as "headend computing devices"). Although the example of FIG. 1 illustrates the computing devices of the central office 108 in a single location, in some examples the computing devices of the central office may distributed amongst multiple locations and/or may be eliminated entirely (e.g., in the case of a highly decentralized distributed computing platform).

Each computing device of the central office may include one or more processors 112 and memory 114. The memory 114 may include processor-readable instructions, which when executed by the one or more processors 112 configure the computing device to perform functions that may include some or all of the functions described herein. The computing device of the central office also includes one or more network connections 116, which allow the central office computing devices to communicate with the data collectors 102 and other network devices in the utility communication network.

The memory 114 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

In the illustrated example, the memory 114 includes a command aggregator 118, which is configured to manage communications between the central office 108 and the data collectors 102. The memory 114 also includes a load balancing frontend 120 to distribute incoming communications among multiple message processors 122-1 through 122-P (collectively referred to as message processors 122). In this example, P represents any number of one or more message processors needed to handle communications incoming to the central office 108. The load balancing frontend 120 may use any conventional load balancing technique to distribute incoming communications amongst the message processors 122. The number of message processors 122 may be dynamically adjusted to scale the central office message handling capacity to meet demand. Within each message processor 122, a threaded model enables parallel processing of incoming messages. Using the load balancing frontend 120, additional message processors 122 can be included in the configuration to extend the system's concurrent processing capabilities.

When the central office 108 receives a communication from one of the data collectors 102, the communication is routed by the load balancing frontend 120 to one of the message processors 122. The message processor 122 then processes the communication using one or more threads and updates a data store 124 of the central office 108 accordingly. The data store 124 includes one or more management lists 126, which include, among other things, assignments of which data collector(s) is/are assigned to each endpoint as primary, secondary, and tertiary data collectors. Additional details of the management lists 126 are described below with reference to FIG. 2 (an example management list 212 of a particular data collector) and FIG. 4 (detailed description of contents of an example management list). The data store 124 also includes consumption data 128, when incoming messages include resource consumption data of one or more endpoints 104, the processed data is stored as consumption data 128 in the data store 124. Additional details of the consumption data 128 are described below with reference to FIG. 5. The data store 124 may additionally or alternatively hold one or more endpoint reporting schedules (specifying when specific endpoints are to bubble up their resource consumption data), data collector upload schedules (specifying when specific data collectors are to upload their data to the central office 108), and/or data collector report lists (indicating which endpoints are assigned to a particular primary data collector), before such schedules/lists are sent to the respective data collectors and/or endpoints.

Example Data Collector

FIG. 2 is a diagram showing example details of a data collector, such as the data collectors 102 of FIG. 1. The data collector 102 may be configured as or disposed at a server, a smart transformer, a relay, a router, or other computing device capable of collecting or aggregating communications from a plurality of endpoints. The data collector 102 may include a radio 202 and a processing unit 204. The radio 202 may provide two-way radio frequency (RF) communication between the data collector 102 one or more endpoints (e.g., endpoints 104 in FIG. 1), computing devices of a central office (e.g., central office 108), and/or other devices in the utility communication network. The processing unit 204 may include one or more processors 206 and memory 208. The memory 208 may include processor-readable instructions, which when executed by the one or more processors 206 perform functions that may include some or all of the functions described herein. In a further example, the functionality of the processor(s) 206 and processor-executable instructions defined in the memory 208 may be performed by a hardware device, such as an application specific integrated circuit (ASIC), a gate array or other hardware-based logic device.

In the example data collector 102 of FIG. 2, the memory 208 may include software functionality configured as one or more "modules." However, as with the memory 114, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). The memory 208 of the data collector 102 may include a reporting module 210 configured to report resource consumption data of endpoints for which the data collector is designated as the primary data collector and is therefore responsible for reporting resource consumption data to the central office.

A management list 212 specific to the data collector 102 stored in the memory 208 defines the endpoints for which the data collector 102 is designated as a primary, secondary, and/or tertiary data collector. The data collector 102 generally serves as primary data collector for only a subset of the endpoints from which the data collector actually receives resource consumption data. Typically, the subset of endpoints for which the data collector serves as the primary data collector is based on the signal strengths (or "read quality") of communications the data collector receives from the endpoints. Specifically, the data collector generally serves as primary data collector for endpoints with which the data collector has a signal strength stronger than any other data collector in the utility communication network has with the respective endpoints. Additionally, in some implementations, a load on the data collector (e.g., a volume of network traffic, a number of endpoints the data collector is responsible for reporting, etc.) may be taken into account when designating a data collector as a primary data collector for a node. For example, if a data collector is near capacity (in terms of traffic or number of endpoints), the data collector may not be assigned as primary data collector for an endpoint despite having a strongest signal strength with the endpoint.

The data collector management list 212 may have been received from the central office 108. Alternatively, in some instances, the individual endpoints may determine which data collector will serve as its primary data collector. The endpoint may make this determination based on, for example, a signal strength of communications between itself and the data collector (as measured by the endpoint, data collector, or both). In that case, the data collector 102 may update its data collector management list 212 to include endpoints from which the data collector has received a request to serve as the primary data collector. In some instances, the data collector 102 may then convey the updated data collector management list 212 to the central office 108.

The memory 208 of the data collector 102 may also include a data collector upload schedule 214, which defines when and how frequently the data collector 102 is to upload resource consumption to the central office 108. The data collector upload schedule 214 may have been received from the central office 108. Typically, the data collector upload schedule 214 schedules uploads at intervals uniformly allocated across a reporting period in order to balance system load and network traffic. Additionally, while not shown, the memory 208 may include a schedule of data collector configuration updates. Data collector configuration updates are independent of the upload schedule and typically are scheduled to occur less frequently than the resource consumption data uploads.

The memory 208 of the data collector 102 also includes resource consumption data 216 received from a plurality of endpoints. The plurality of endpoints may include endpoints for which the data collector is designated as the primary data collector, endpoints for which the data collector is designated as the secondary data collector, endpoints for which the data collector is designated as the tertiary data collector, as well as other endpoints. The data collector 102 is configured to measure read quality statistics, such as signal strength, of the communications containing resource consumption data and to report these statistics to the central office 108 to allow the central office 108 to rank and re-rank the best data collectors for each endpoint. In this way, the assignment of primary, secondary, and tertiary data collectors for each endpoint may be updated periodically or as needed to reflect a current state of the utility communication network. In some implementations the data collector 102 may be configured to store resource consumption data for all endpoints from which it receives resource consumption data (i.e., all endpoints within communication range of the data collector). However, in other implementations, the data collector may be configured to report read quality statistics for all endpoints, but to store resource consumption data only for endpoints in its data collector management list 212 (i.e., endpoints for which the data collector is primary, secondary, or tertiary data collector). The data collector management list 212 controls message redundancy by allocating a number of data collectors (e.g., 2, 3, 4, etc.) to collect and store resource consumption data from each endpoint, but only the data collector tagged as the primary data collector is responsible for uploading resource consumption data according its upload schedule 214. Each endpoint's assigned secondary and tertiary data collectors are used for redundancy in cases where the regularly scheduled reads are not provided by the primary for some reason.

In addition to the radio 202, the data collector 102 may include one or more other network connections 218, such as power line communications (PLC) connections, Ethernet or other wired network connections, cellular communication connections, or the like. As such, the data collector 102 also includes any ancillary hardware, modules, and/or interfaces associated with or needed for the operation of the particular network connections.

Example Endpoint

FIG. 3 is a diagram showing example details of an individual endpoint, such as one of the endpoints 104. The endpoint 104 may be configured for interaction with the example data collector 102 of FIG. 2. The endpoint 104 may be configured as or disposed at a smart utility meter, a sensor, a control point, or other computing device capable of collecting or communicating data to a central office of an AMI or similar utility communication network.

In one example, the endpoint 104 may include a radio 302 and a processing unit 304. The radio 302 may provide two-way RF communication with the data collector 102 and/or other endpoints. The processing unit 304 may include one or more processors 306 and memory 308 and/or other hardware device(s), such as an application specific integrated circuit (ASIC), a gate array or other hardware-based logic device. In a manner similar to that described with reference to the data collector 102 of FIG. 2, the endpoint 104 of FIG. 3 may include software functionality configured as one or more "modules" within the memory 308. Accordingly, while various "modules" are discussed, their functionality and/or similar functionality could be arranged differently.

A metrology module 310 may be configured to receive consumption data that is obtained from a meter (which may be integral to or associated with the endpoint). The metrology module 310 may provide the consumption data to the data collector 102 (of FIGS. 1 and 2) by RF transmission via the radio 302. The consumption data may be formatted and/or packetized in a manner or protocol expected by the data collector 102 and may be reported according to a reporting schedule 312. The reporting schedule 312 may be communicated to the endpoint 104 from the data collector 102, and may include, for example, a starting time, transmission protocol, frequency, and/or number of times/attempts that the endpoint is to report its resource consumption data. Unless otherwise indicated, the endpoint may transmit its resource consumption data by broadcasting it on a communication channel using the radio 302.

The memories 114, 208, and 308 are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Management List

FIG. 4 illustrates additional details of an example management list 126 stored in memory of the central office 108 in FIG. 1. As discussed above, the management list 126 includes assignments of which data collector(s) is/are assigned to each endpoint as primary, secondary, and tertiary data collectors. For example, in the context of the example of FIG. 1, endpoints 104-1, 104-2, and 104-3 have all been assigned data collector 102-1 as their primary data collector to report their resource consumption data to the central office 108. Endpoints 104-1, 104-2, and 104-3 may or may not be assigned one or more secondary and/or tertiary data collectors. However, those assignments are not shown in the example of FIGS. 1 and 4.

Endpoint 104-4 is assigned data collector 102-2 as its primary data collector to report its resource consumption data to the central office 108. Data collector 102-1 is assigned as a secondary data collector for endpoint 104-4, and data collector 102-3 is assigned as a tertiary data collector for endpoint 104-4. While a high read reliability is expected using just the endpoint's primary data collector, there may be instances when the primary data collector will not capture all the scheduled resource consumption data (e.g., due to interference, communication collisions, the data collector being busy doing other operations, failure of the data collector, etc.). Thus, toward the end of the reporting period (e.g., after all scheduled uploads from data collectors should have occurred), if the central office 108 has not received the resource consumption data for an endpoint (e.g., endpoint 104-4), the central office 108 may request the missing resource consumption data first from the secondary data collector (data collector 102-1 in this example) and then from the tertiary data collector (data collector 102-3 in this example). This is done in an attempt to obtain reads for every endpoint in the utility communication network.

In FIG. 4, the management list 126 also includes a load on the primary, secondary, and tertiary data collectors. As mentioned above, in some implementations, the load on the data collectors may be taken into account in deciding which data collectors serve as primary data collectors for the various endpoints. In this example, the load is shown as a percentage of peak load or a percentage of maximum load on the data collector, in terms of volume of network communications received by the data collector and/or in terms of a number of endpoints for which the data collector serves as primary data collector.

Example Consumption Data

FIG. 5 illustrates additional details of the example consumption data 128 stored in memory of the central office 108 in FIG. 1. As shown in FIG. 5, the consumption data 128 includes, for each endpoint, a record of resource consumption for reporting periods including Period 1, Period 2, . . . , up to a Current Period. For each period, the consumption data 128 indicates a number of units of resource consumed at the endpoint (e.g., natural gas, water, or electricity) and a data collector that uploaded the resource consumption data to the central office 108. In the illustrated example, the data collector is indicated by "Primary," "Secondary," or "Tertiary," to indicate which data collector associated with the endpoint uploaded the data. However, in other examples, the data collector that uploaded the data may be identified by endpoint identifier, or any other suitable designator.

In the example of FIG. 5, during Period 1, the central office 108 received consumption data for all of the endpoints 104-1 through 104-7 from the endpoints' respective primary data collectors. During Period 2, the central office 108 received consumption data for endpoints 104-1 through 104-3 and 104-5 though 104-7 from the endpoints' respective primary data collectors. However, in Period 2, the central office 108 did not receive consumption data for endpoint 104-4 from the primary data collector and had to request and obtain the missing consumption data from the endpoint's secondary data collector.

The empty fields in the Current Period reflect the fact that the current period has not ended yet and the central office 108 has not yet received consumption data from the data collectors and/or the data collectors have not yet received the resource consumption data from the endpoints. Toward the end of the reporting period, if the central office 108 still has not received the resource consumption data for these endpoints, the central office will request the missing resource consumption data from the secondary and/or tertiary data collectors of the respective endpoints.

Example Methods of Coordinating Collection of Resource Consumption Data

Figure 6:
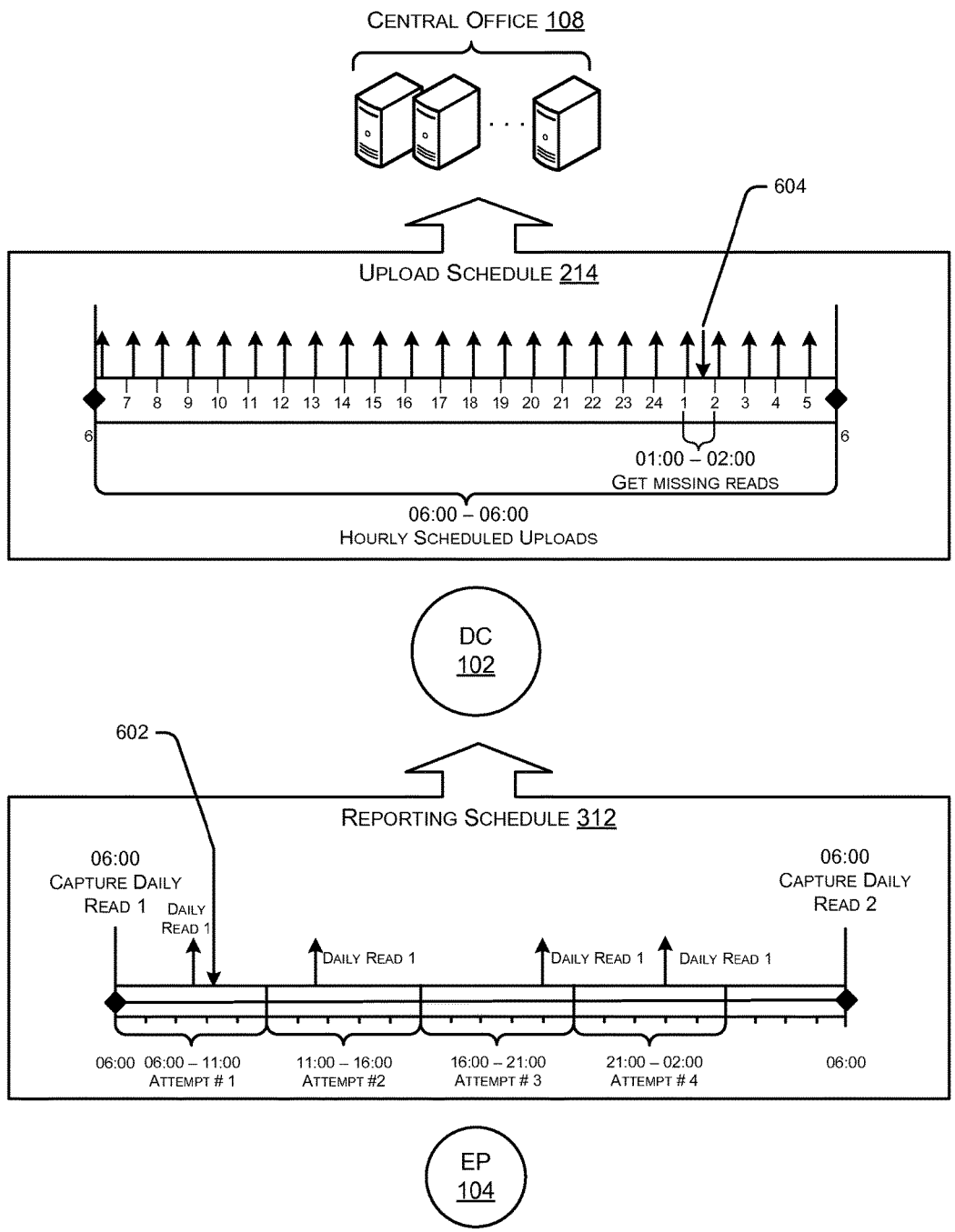
FIG. 6 is a schematic diagram showing an example of how resource consumption data is bubbled up from an endpoint, collected at a data collector, and uploaded to the central office.

FIG. 6 is a schematic diagram illustrating one example process of coordinating collection of resource consumption data. As shown in FIG. 6, an endpoint 104 captures resource consumption data (i.e., "Capture Daily Read 1") at the beginning of a reporting period (i.e., at 06:00 in this example), and begins reporting the captured daily read 1 according to its reporting schedule, such as reporting schedule 312. The reporting schedule 312 instructs the endpoint 104 to report or broadcast its resource consumption data at intervals spaced throughout the reporting period. In the illustrated example, the endpoint 104 is scheduled to report its resource consumption data four times, once during each of the next four five-hour intervals. In some instances, the particular report times within each of the five-hour intervals may be randomly staggered to avoid temporal packet losses to achieve higher system reliability.

FIG. 6 also illustrates a situation in which the data collector 102 is missing resource consumption data from one or more prior reporting periods. In that case, upon receiving the first broadcast of the Daily Read 1, the data collector 102 may send a request 602 for the missing resource consumption data from the prior period. In response to receiving the request 602, the endpoint 104 may immediately provide the missing resource consumption data from the prior period, or may provide the missing resource consumption data from the prior period along with a next regularly scheduled reporting time (i.e., at the second instance of Daily Read 1).

During the same reporting period, data collector 102 is configured to periodically upload data that it has received to the central office 108 according to an upload schedule, such as upload schedule 214. Specifically, data collector 102 is configured to automatically upload resource consumption data of endpoints for which it is designated as primary data collector. In the illustrated example, the upload schedule 214 instructs the data collector 102 to upload resource consumption data it has received relating to endpoints for which it is the primary data collector and which it has not previously uploaded. However, the data collector 102 also collects and stores resource consumption data of endpoints for which it is designated as a secondary or tertiary data collector. In this way, the data collector 102 avoids uploading resource consumption data that the central office has already received, while still retaining resource consumption data of other endpoints for retrieval by the central office if needed. In the illustrated example, the uploads are scheduled to occur substantially evenly throughout the reporting period (e.g., approximately once per hour).

Toward the end of the reporting period (from 01:00-02:00 in the example), if the central office 108 still has not received resource consumption data for one or more endpoints, the central office 108 will send a request 604 to the data collector 102 for missing resource consumption data associated with endpoints for which the data collector is a secondary or tertiary data collector (i.e., is not primarily responsible for reporting). The data collector 102 may respond to the request 604 by providing the missing resource consumption data immediately or, as shown in FIG. 6, along with the next scheduled upload.

Figure 7:
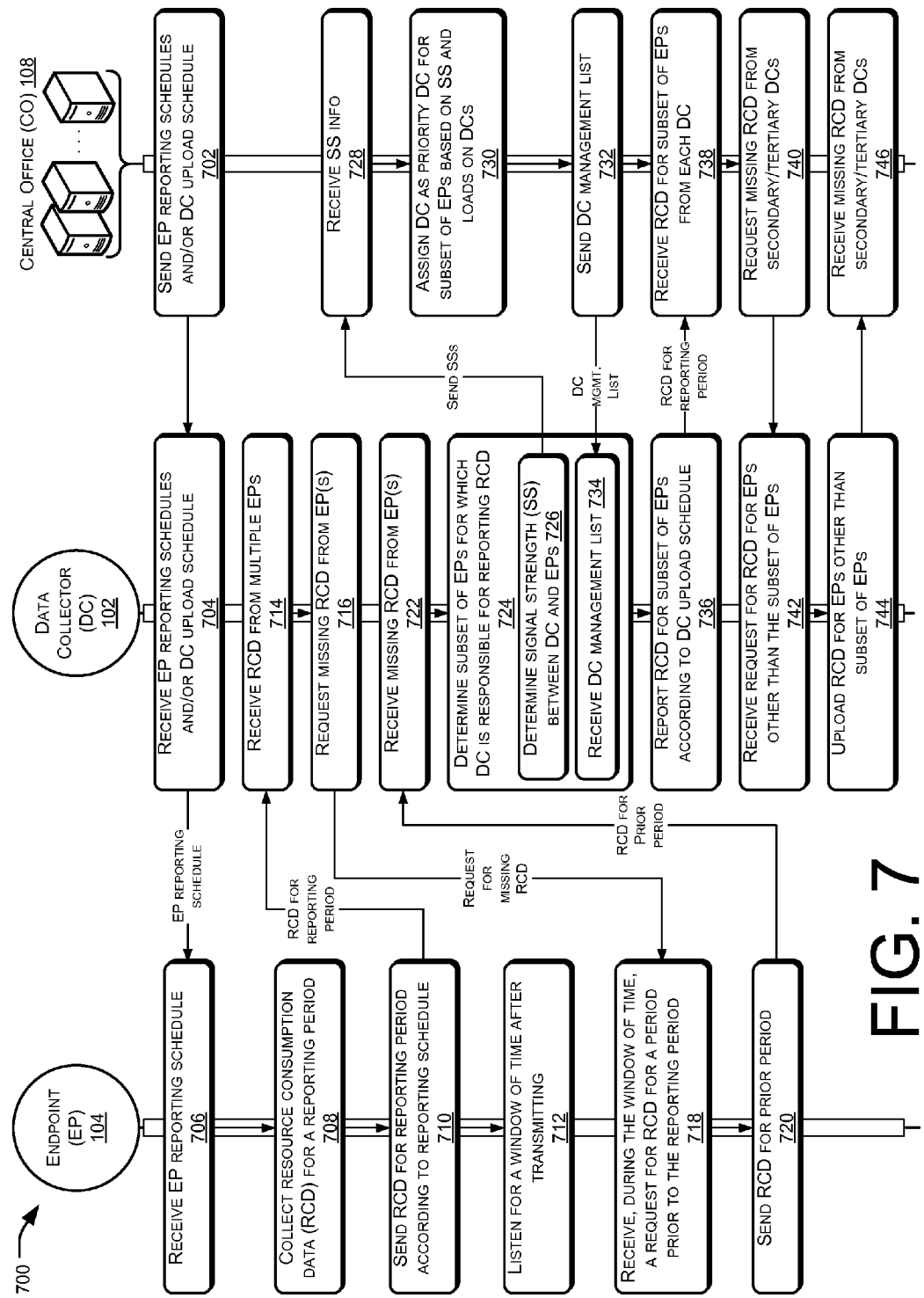
FIG. 7 is a signal flow diagram illustrating example methods performed by an example endpoint, data collector, and central office.

FIG. 7 is a signal flow diagram which illustrates an example flow of operations 700 that may be performed by various devices of a utility communication network and/or AMI to facilitate coordinated collection of resource consumption data. The example flow of operations 700 is described in the context of the example of system 100 and using the central office 108, data collector 102, and one of the endpoints 104 of FIG. 1. However, the flow of operations 700 is not limited to use with the system and devices of FIG. 1 and may be implemented using other systems and devices.

The flow of operations 700 begins, at block 702, with a server or head-end device of a central office of a utility company (e.g., central office 108) sending one or more endpoint reporting schedules (e.g., reporting schedule 312) and/or data collector upload schedules (e.g., upload schedule 214) to a data collector (e.g., data collector 102). At block 704, the data collector 102 receives the endpoint reporting schedules 312 and data collector upload schedule 214. The data collector 102 may then store the data collector update schedule 214 in memory, and then, at block 706, forward the endpoint reporting schedule 312 to an endpoint (e.g., endpoint 104).

At block 706, the endpoint 104 receives the endpoint reporting schedule 312 and stores it in memory of the endpoint. The endpoint reporting schedule may specify when, how frequently, and how many times the endpoint is to report its resource consumption data. For example, the reporting schedule may specify that the endpoint is to report the resource consumption data for the reporting period multiple times substantially evenly spaced throughout the reporting period.

Meanwhile, at block 708, the endpoint receives or collects resource consumption data for a reporting period from a metrology module (e.g., metrology module 310) of the endpoint or a meter associated with the endpoint. At block 710, the endpoint 104 sends the resource consumption data for the reporting period to the data collector 102 according to the reporting schedule 312. The endpoint 104 may send the resource consumption data by, for example, broadcasting the resource consumption data on a communication channel. Immediately after broadcasting the resource consumption data, the endpoint may begin, at block 712, listening on the communication channel for a window of time.

At block 714, the data collector 102 receives the resource consumption data for the reporting period from the endpoint 104 as well as other endpoints. In the event that the data collector 102 is missing resource consumption data from a prior reporting period, at block 716, the data collector 102 may request, from the endpoint 104, the missing resource consumption data from one or more periods prior to the current reporting period. At 718 (during the window of time that the endpoint listens at block 712), the endpoint 104 receives the request from the data collector 102 to provide resource consumption data for the period prior to the current reporting period. Then, at block 720, the endpoint 104 sends the resource consumption data for the period prior to the reporting period to the data collector 102. The endpoint 104 may send the resource consumption data for the prior reporting period immediately upon receiving the request, or it may wait and send the resource consumption data for the prior reporting period at a next scheduled reporting time (e.g., as shown in FIG. 6). At block 722, the data collector 102 receives the missing resource consumption data for the prior reporting period.

At block 724, the data collector determines a plurality of endpoints for which the data collector 102 is the primary data collector and is, therefore, responsible for pushing or reporting resource consumption data to the central office 108. The plurality of endpoints for which the data collector 102 is the primary data collector generally comprises a subset of the endpoints from which the data collector 102 receives resource consumption data. In one example, the data collector 102 determines the subset of endpoints for which it is responsible by first, at block 726, determining a signal strength of communications between the data collector 102 and each endpoint from which it receives resource consumption data. The data collector then sends this signal strength information to the central office 108, where it is received at block 728. At block 730 in this example, the central office 108 assigns the data collector as the priority data collector for one or more endpoints based at least in part on the signal strength information. In some instances, the central office 108 may also take into account loads on the data collector 102 and other proximate data collectors in the utility communication network when assigning the data collector as a primary data collector to the one or more endpoints. At block 732, the central office 108 sends a data collector report list (e.g., data collector management list 212) to the data collector 102. The data collector management list 212 indicates that the data collector is primary data collector for the subset of the plurality of endpoints and is responsible for reporting resource consumption data of the subset of the plurality of endpoints to the central office 108. At block 734, the data collector receives the data collector management list 212.

At block 736, the data collector 102 reports resource consumption data for the subset of endpoints to the central office 108 at times specified by the data collector upload schedule 214. The central office 108 receives the resource consumption data for the subset of endpoints at block 738. The central office 108 likewise receives resource consumption data from other data collectors for other, different subsets of endpoints for which the other data collectors are primary data collectors. The subsets of endpoints are mutually exclusive. That is, no two data collectors will upload resource consumption data for the same endpoint.

If the central office 108 hasn't received resource consumption data of an endpoint by a certain time (e.g., near an end of the reporting period), the central office 108 may determine that resource consumption data is missing and may, at block 740, request the missing resource consumption data of the endpoint from a second, non-primary data collector (i.e., a secondary or tertiary data collector of the endpoint). That is, the missing resource consumption data is for an endpoint that is not in the subset of endpoints for which the data collector is responsible. At block 742, the data collector 102 receives the request for the missing resource consumption data of an endpoint for which the data collector 102 is not responsible, but for which the data collector 102 has received resource consumption data. Thereafter, at block 744, the data collector 102 uploads the missing resource consumption data to the central office 108, where it is received at block 746.

The flow of operations 700 is illustrated as a collection of blocks and/or arrows representing a sequence of operations that can be implemented in hardware, software, firmware, or a combination thereof. The order in which the blocks are described is not intended to be construed as a limitation, and any number of the described operations can be combined in any order to implement one or more methods, or alternate methods. For example, the determining of block 724 may be performed before or after receiving any resource consumption data from the endpoint 104 at block 714 and/or 722. Additionally, individual operations may be omitted from the flow of operations without departing from the spirit and scope of the subject matter described herein. In the context of software, the blocks represent computer instructions that, when executed by one or more processors, perform the recited operations. In the context of hardware, the blocks may represent one or more circuits (e.g., application specific integrated circuits—ASICs) configured to execute the recited operations.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A data collector configured to collect resource consumption data from endpoints of a utility communication network for reporting to a head-end computing device of the utility communication network, the data collector comprising:

a processing unit comprising logic configured to implement acts comprising:
receiving from the head-end computing device a report list indicating that the data collector is a primary data collector for a subset of a plurality of endpoints of a utility communication network and is responsible for reporting resource consumption data of the subset to the head-end computing device;
receiving, from the subset of the plurality of endpoints and a plurality of endpoints other than the subset, communications reporting resource consumption data of the subset of the plurality of endpoints and the plurality of endpoints other than the subset;
storing resource consumption data in a memory of the data collector, wherein the stored resource consumption data distinguishes data received from the subset of the plurality of endpoints and data received from the plurality of endpoints other than the subset; and
reporting, to the head-end computing device, resource consumption data for the subset of the plurality of endpoints for which the report list indicates that the data collector is the primary data collector, while refraining from reporting resource consumption data to the head-end computing device received from the endpoints other than the subset of the plurality of endpoints and identified in the memory as data from secondary or tertiary endpoints with respect to the data collector.

2. The data collector of claim 1, wherein the subset of the plurality of endpoints for which the data collector reports resource consumption data to the head-end computing device comprises endpoints for which no other data collector in the utility communication network is configured to report resource consumption data.

3. The data collector of claim 1, wherein the subset of the plurality of endpoints for which the data collector is responsible for reporting resource consumption data to the head-end computing device comprises endpoints with which the data collector has a signal strength stronger than any other data collector in the utility communication network has with the respective endpoints.

4. The data collector of claim 1, the acts further comprising:
  determining a signal strength of communications between the data collector and each endpoint of the plurality of endpoints; and
  sending, to the head-end computing device, the determined signal strengths between the data collector and the plurality of endpoints; the determined signal strengths being usable by the head-end computing device to generate the report list.

5. The data collector of claim 1, wherein the subset of the plurality of endpoints for which the data collector is responsible for reporting resource consumption data to the head-end computing device is based on:
  signal strength of communications between the data collector and the plurality of endpoints; and
  a load on the data collector relative to other proximate data collectors in the utility communication network.

6. The data collector of claim 1, wherein reporting resource consumption data to the head-end computing device for the subset of the plurality of endpoints comprises:
  uploading, to the head-end computing device, at a first scheduled time during a reporting period, all resource consumption data of endpoints of the subset of the plurality of endpoints that has been received by the data collector for the reporting period as of the first scheduled time;
  receiving, from the plurality of endpoints, additional communications including resource consumption data; and
  uploading, to the head-end computing device, at a second scheduled time during the reporting period, all resource consumption data of endpoints of the subset of the plurality of endpoints that has been received by the data collector for the reporting period as of the second scheduled time and that has not previously been uploaded to the head-end computing device.

7. The data collector of claim 1, wherein reporting resource consumption data to the head-end computing device for the subset of the plurality of endpoints comprises automatically pushing the resource consumption data of the subset of the plurality of endpoints to the head-end computing device.

8. The data collector of claim 7, further comprising:
  receiving, from the head-end computing device, a request for resource consumption data of an endpoint other than the subset of endpoints for which the data collector is responsible for reporting resource consumption data to the head-end computing device, and for which the data collector has received resource consumption data; and
  uploading, to the head-end computing device, the requested resource consumption data for the endpoint.

9. The data collector of claim 7, wherein automatically pushing the resource consumption data of the subset of the plurality of endpoints to the head-end computing device, comprises automatically pushing at least a portion of the resource consumption data of the subset of the plurality of endpoints at multiple times scheduled substantially uniformly throughout a reporting period.

10. The data collector of claim 1, further comprising:
  determining that the data collector did not receive resource consumption data, corresponding to a first reporting period, from a particular endpoint of the subset of endpoints for which the data collector is responsible for reporting resource consumption data to the head-end computing device;
  receiving, from the particular endpoint, resource consumption data corresponding to a second reporting period subsequent to the first reporting period; and
  sending a request to the particular endpoint, requesting that the particular endpoint provide the resource consumption data from the first reporting period.

11. A method comprising:
  under control of a computing device of a utility head-end computing device configured with computer-executable instructions:
  sending, to a first data collector, a first upload schedule that is stored in a memory of the first data collector indicating multiple times during a first reporting period at which the first data collector is to upload resource consumption data for a first plurality of endpoints for which the first data collector is responsible for providing resource consumption data;
  sending, to a second data collector, a second upload schedule that is stored in a memory of the second data collector indicating multiple times during a second reporting period at which the second data collector is to upload resource consumption data for a second plurality of endpoints for which the second data collector is responsible for providing resource consumption data, wherein the second data collector is additionally directed to store, but not push to the utility head-end computing device, at least some of the resource consumption data for the first plurality of endpoints;
  receiving, pushed from the first data collector, resource consumption data of the first plurality of endpoints for which the first data collector is responsible for providing resource consumption data in accordance with the first upload schedule;
  receiving, pushed from the second data collector, resource consumption data of the second plurality of endpoints for which the second data collector is responsible for providing resource consumption data in accordance with the second upload schedule;
  determining that the utility head-end computing device is missing resource consumption data of an endpoint for which the first data collector is a primary collector and is responsible for providing resource consumption data and for which the second data collector is a secondary data collector; and
  requesting, from the second data collector, the missing resource consumption data of the endpoint, which was previously stored by the second data collector, but not pushed by the second data collector to the head-end computing device.

12. The method of claim 11, further comprising receiving, from the second data collector, the missing resource consumption data of the endpoint.

13. The method of claim 11, further comprising requesting, from a third data collector, the missing resource consumption data of the endpoint.

14. The method of claim 11, wherein the first plurality of endpoints and the second plurality of endpoints are mutually exclusive, but the first data collector and the second data collector both receive resource consumption data from at least one common endpoint.

15. The method of claim 11, further comprising, prior to receiving resource consumption data pushed from the first and second data collectors:
  sending, to the first data collector, a first report list indicating the first plurality of endpoints for which the first data collector is responsible for reporting resource consumption data to the head-end computing device; and
  sending, to the second data collector, a second report list indicating the second plurality of endpoints for which the second data collector is responsible for reporting resource consumption data to the head-end computing device.

* * * * *